(12) United States Patent
Vendrow et al.

(10) Patent No.: US 9,350,772 B2
(45) Date of Patent: May 24, 2016

(54) SYSTEMS AND METHODS FOR MAKING COMMON SERVICES AVAILABLE ACROSS NETWORK ENDPOINTS

(71) Applicant: RingCentral, Inc., San Mateo, CA (US)

(72) Inventors: Vlad Vendrow, Redwood City, CA (US); Patrice Khawam, San Francisco, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 14/523,168

(22) Filed: Oct. 24, 2014

(65) Prior Publication Data

US 2016/0119387 A1 Apr. 28, 2016

(51) Int. Cl.
*H04L 12/16* (2006.01)
*G06F 15/16* (2006.01)
*H04L 29/06* (2006.01)
*H04L 12/18* (2006.01)
*H04W 4/06* (2009.01)

(52) U.S. Cl.
CPC ........ *H04L 65/1096* (2013.01); *H04L 12/1813* (2013.01); *H04L 65/1069* (2013.01); *H04L 65/403* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 6,247,057 B1 | 6/2001 | Barrera, III | |
| 7,945,612 B2 | 5/2011 | Raghav et al. | |
| 8,024,397 B1 | 9/2011 | Erickson et al. | |
| 8,543,527 B2 | 9/2013 | Bates et al. | |
| 8,543,665 B2 | 9/2013 | Ansari et al. | |
| 8,700,690 B2 | 4/2014 | Raghav et al. | |
| 2002/0099854 A1* | 7/2002 | Jorgensen | 709/249 |
| 2008/0013546 A1 | 1/2008 | Bhatt et al. | |
| 2008/0120129 A1 | 5/2008 | Seubert et al. | |
| 2008/0279119 A1* | 11/2008 | Stille | H04L 69/24 370/261 |
| 2009/0083441 A1 | 3/2009 | Clark et al. | |
| 2010/0049846 A1 | 2/2010 | Ballette et al. | |
| 2010/0177711 A1* | 7/2010 | Gum | 370/329 |
| 2011/0063407 A1* | 3/2011 | Wang | 348/14.09 |
| 2011/0110505 A1* | 5/2011 | Arthur et al. | 379/93.21 |
| 2011/0145314 A1 | 6/2011 | Knize et al. | |
| 2011/0154222 A1* | 6/2011 | Srinivasan et al. | 715/753 |
| 2011/0228750 A1* | 9/2011 | Tomici et al. | 370/338 |
| 2012/0030365 A1 | 2/2012 | Lidstrom et al. | |
| 2012/0071200 A1* | 3/2012 | Bienas et al. | 455/525 |
| 2012/0072499 A1 | 3/2012 | Cipolli et al. | |
| 2014/0171065 A1* | 6/2014 | Graessley | 455/426.1 |
| 2014/0362764 A1* | 12/2014 | Aksu | 370/328 |
| 2015/0046826 A1 | 2/2015 | Mann et al. | |
| 2015/0081769 A1 | 3/2015 | Mandyam et al. | |

OTHER PUBLICATIONS

U.S. Appl. No. 14/536,579, filed Nov. 7, 2014.

* cited by examiner

*Primary Examiner* — Brandon Renner
(74) *Attorney, Agent, or Firm* — Finnegan, Henderson, Farabow, Garrett & Dunner LLP (57) ABSTRACT

Systems and methods are disclosed for providing access to common services in a communication session. According to certain embodiments, a request to initiate a communication session is received. The communication can include a plurality of endpoints. An inventory of available services can be determined for each of the plurality of endpoints. At least one service that is commonly available to at least a subset of endpoints can be identified from the inventories of available services. Access can be provided to the at least one common service to the subset of endpoints during the communication session.

29 Claims, 7 Drawing Sheets

SYSTEMS AND METHODS FOR MAKING COMMON SERVICES AVAILABLE ACROSS NETWORK ENDPOINTS

BACKGROUND

The present disclosure relates to communications networks, and particularly to providing communications services to endpoints in such networks.

Teleconferencing allows users to exchange information with one another in real-time from remote locations. Whereas early teleconferencing technologies were limited to audio communications, newer teleconferencing technologies have taken advantage of Internet telephony to provide users with many different means for exchanging information among users. Internet teleconferencing includes a variety of different teleconferencing technologies, such as telephone conferencing, videoconferencing, and web conferencing. In addition to facilitating audio and video communications, web conferencing allows users to exchange information using a variety of other means, such as presentations, screen sharing, text chat, instant messaging, whiteboarding, and map and location sharing.

Web conferencing is often implemented via a software application provided by a web conferencing service provider. The means for communication provided to a conference participant can vary based on the service provider, application, application version, and hardware. For example, some service providers may offer only basic audio-video teleconferencing services, whereas other service providers may provide a wider range of teleconferencing services (e.g., screen sharing, text chat). A service provider may offer several different applications, each of which can include different features, and different versions of the same application may be released as new features are implemented or updated. Moreover, the teleconferencing features available to a user can vary based on hardware. For example, more features may be available to a user on a teleconferencing application installed on a personal computer than on an application installed on a mobile phone or tablet, even when the teleconferencing services are provided by the same service provider.

SUMMARY

Consistent with the present disclosure, systems and methods are provided for enabling communication between devices using a communication service shared by at least a subset of the devices in a communication session. Embodiments consistent with the present disclosure include computer-implemented systems and methods for determining services that are available to network endpoints participating in a communication session and identifying services that are common to a subset of the network endpoints. In addition, systems and methods consistent with the present disclosure can provide access to the common services to the subset of endpoints, either by hosting the common services or providing information to the endpoints that enables the endpoints to engage in peer-to-peer communication using the common services. Embodiments consistent with the present disclosure can overcome one or more of the drawbacks or problems set forth above.

In accordance with some example embodiments, a computerized method is provided for providing access to common services. According to the method, a request to initiate a conference session for a plurality of endpoints is received over a network. The method also includes accessing, for each of the plurality of endpoints, an inventory of services available to the endpoint. The inventories of services available to each endpoint are compared by at least one processor. The at least one processor further identifies at least one common service available to a subset of the plurality of endpoints. Moreover, the method includes providing access to the at least one common service to each endpoint in the subset during the conference session.

In accordance with some example embodiments, a system is provided for providing access to common services. The system includes a network interface and at least one processor in communication with the network interface. The processor is configured to receive, via the network interface, a request to initiate a conference session for a plurality of endpoints. The processor is also configured to access, for each of the plurality of endpoints, an inventory of services available to the endpoint. Moreover, the processor is configured to compare the inventories of services available to each endpoint and identify at least one common service available to a subset of the plurality of endpoints. Further, the processor is configured to provide access to the at least one common service to each endpoint in the subset during the conference session In accordance with some example embodiments, a computer readable storage medium is provided including a set of instructions that are executable by at least processor to cause the at least one processor to provide access to common services. When executed, the set of instructions can cause at least one processor to perform steps for receiving, over a network, a request to initiate a conference session for a plurality of endpoints. The instructions can further cause the processor to access, for each of the plurality of endpoints, an inventory of services available to the endpoint. The steps performed by the processor also include comparing, by at least one processor, the inventories of services available to each endpoint and identifying, by the at least one processor, at least one common service available to a subset of the plurality of endpoints. Moreover, the steps performed by the processor include providing access to the at least one common service to each endpoint in the subset during the conference session.

Before explaining certain example embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, it is appreciated that the conception and features upon which this disclosure is based can readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various example embodiments described herein.

DETAILED DESCRIPTION

Reference will now be made in detail to the example embodiments implemented according to the disclosure, the examples of which are illustrated in the accompanying drawings. Wherever possible, the same reference numbers will be used throughout the drawings to refer to the same or like parts.

Although advances in conferencing technologies have enabled users to exchange information more efficiently than prior systems, present conferencing solutions also suffer from a number of drawbacks. For example, whereas a user may be able to communicate with others using several different services (e.g., audio, video, instant messaging), the user may be able to use only a subset of those services if other conference participants have more limited capabilities (e.g., based on hardware/software limitations). Further, current conferencing solutions do not provide users with information regarding the conferencing capabilities of other participants in the same web conference session. Thus, participants in a web conference session may be unaware of all means of communication available to them in a particular session. Aspects of the disclosed example embodiments seek to address these and other concerns regarding the existing conferencing solutions in communications network.

Embodiments of the present disclosure provide improved systems and methods for making common services available across network endpoints. The disclosed embodiments provide network endpoints with information regarding the services that are available at other network endpoints, such that users engaged in a conferencing session can determine a means through which to communicate with one another from among an inventory of available means. In some embodiments, a server can provide each network endpoint with an inventory of common services and then host a conferencing session among the endpoints using one or more selected common services. In other embodiments, the server can provide each network endpoint with the inventory of common services and information enabling the network endpoints to communicate directly with one another (i.e., peer-to-peer communication) using a common service. Thus, the server can simply provide information to the network endpoints regarding the capabilities of other network endpoints, but not host the communications among the network endpoints.

According to certain embodiments, the network endpoints can communicate with one another using one or more services, such as audio conferencing, video conferencing, screen sharing, instant messaging, whiteboarding, and location sharing. The services that are available at a particular endpoint, however, can differ from endpoint to endpoint. For example, the network endpoints can be mobile phones, landline phones, Voice over IP (VoIP) phones, gateways, audio and/or video conferencing devices, gaming consoles, smartwatches, personal computers, laptops, or tablets, each of which may provide different communication capabilities. Accordingly, each endpoint can provide a server with an inventory of services available at the endpoint, which can be stored by the server on a database or other memory. A service is available at an endpoint if the endpoint is programmed to provide the service (e.g., an application that provides the service is installed on the endpoint). The server can identify one or more services that are common to each endpoint, such that the endpoints can determine how to communicate with one another.

Embodiments of the present disclosure provide numerous advantages over conventional conferencing services. For example, users are able to make one another aware of their conferencing capabilities, such that they may choose a means of communication (e.g., audio, video, instant messaging) that is most convenient and efficient for all conference participants. Users may also associate different preferences with different connection types. For example, a user may not prefer to communicate via video conferencing when the user is communicating over a cellular data (e.g., 3G, 4G) if the cost of communicating via a cellular data network is high. By providing other users with information about these preferences, the user may avoid unwanted costs associated with communicating via video over a cellular network. The disclosed embodiments also enable users to communicate with one another either through a server or via a peer-to-peer connection. For example, users may communicate with one another through a server if the service they wish to use is supported by the server. If the server does not support the service, they may communicate through a peer-to-peer connection.

The example embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems consistent with the present disclosure can include at least one processor and memory, and the memory can be a non-transitory computer-readable storage medium.

As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

Figure 1:
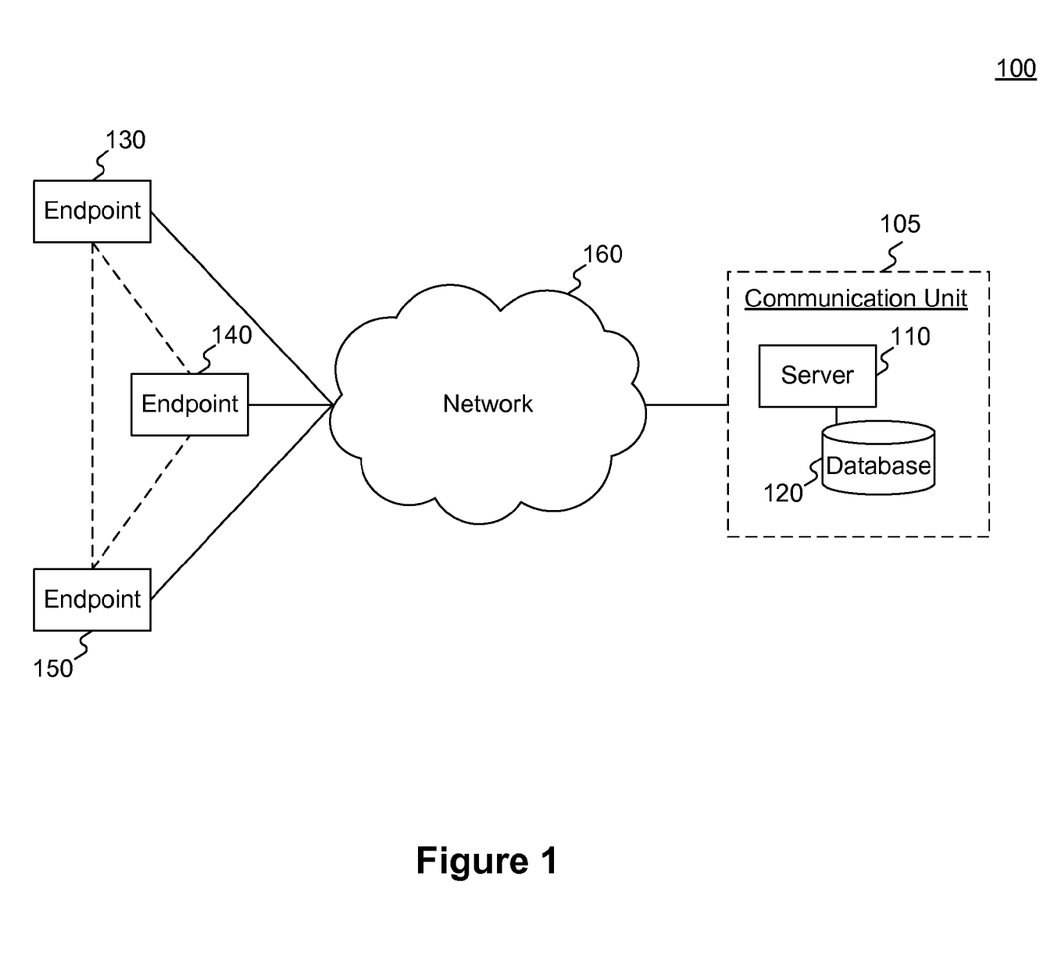
FIG. 1 is a diagram of an example system environment for implementing embodiments consistent with the present disclosure.

FIG. 1 depicts an example system environment for implementing embodiments of the present disclosure. The example embodiment of FIG. 1 depicts a system environment 100, which includes a communication unit 105. Communication unit 105 includes one or more server systems, databases, and computing systems configured to receive information from endpoints over a network, process the information, host communications among the endpoints based on the received information, and transmit information to the endpoints over the network. In the presently described example embodiments, communication unit 105 includes a server 110 and one or more database(s) 120, which are illustrated in a region bounded by a dashed line for communication unit 105 in FIG. 1.

In some example embodiments, communication unit 105 transmits and receives data to and from various other components, such as endpoints 130, 140, and 150, among others. More specifically, communication unit 105 can be configured to receive and store data transmitted from endpoints 130-150 over an electronic network 160 (e.g., comprising the Internet), process the received data, transmit data to endpoints 130-150 over the electronic network 160, and host communications among endpoints 130-150.

According to some embodiments, communication unit 105 receives requests to initiate a communication session including a plurality of network endpoints, such as endpoints 130-150. The session can be established using the Session Initiation Protocol (SIP). A request to initiate a communication session can include, among other things, an identification of the requesting endpoint, an identification of one or more additional endpoints for the communication session, an inventory of services provided by the endpoint, and information regarding the endpoint's coupling to the network (e.g., upload/download speed).

Each service in the inventory of services represents a mode of communication that is provided by the endpoint, such as audio conferencing, video conferencing, screen sharing, instant messaging, whiteboarding, and location sharing. According to some embodiments, a means of communication may include a CODEC that an endpoint uses to code and decode a data stream or signal. In some example embodiments, the inventory of services is provided by a network endpoint and received at communication unit 105 separately from the request. For example, the inventory of services can be provided to communication unit 105 from an endpoint in a prior request and stored by communication unit 105 for future reference.

Moreover, in other embodiments, communication unit 105 requests the inventory of services from an endpoint after receiving the request to initiate a communication session from the endpoint, and the inventory of services can be provided to and received at communication unit 105 in response to the request for the identification of services. Further, communication unit 105 can request an inventory of services from each endpoint identified in the initiation request and receive from each endpoint the inventory of services available at the endpoint in response.

In some embodiments, communication unit 105 receives profile data from network endpoints 130-150. Profile data can be provided by network endpoints 130-150 to communication unit 105 either with the request to initiate a communication session or separately. For example, in response to receiving a request to initiate a communication session, communication unit 105 can send a request to each endpoint identified in the request for profile data. In some embodiments, the inventory of services available to each endpoint 130-150 is stored in the profile data for the endpoint 130-150. The profile data can also include other information regarding communication preferences. For example, the profile data can associate each service available to an endpoint 130-150 with a priority. Thus, the profile of a user who prefers to communicate via instant messaging and does not prefer to communicate via video conferencing can associate instant messaging with a high priority and video conferencing with a low priority. In some embodiments, each service is associated with a different priority, such that the user profile stores a ranking of each of the services. For example, if an endpoint 130-150 supports five different services, each of the five services can be associated with a unique priority from 1 to 5.

According to certain embodiments, the priority associated with a service differs based on a type of network connection. In other words, a user can prefer to communicate using one service (e.g., video conferencing) when the endpoint 130-150 is coupled to the network via WiFi, but prefer to communicate using another service (e.g., audio conferencing) when the endpoint 130-150 is coupled to the network 160 via cellular data. For example, the user may prefer to communicate via video conferencing only when coupled to the network via WiFi to avoid costs associated with transferring large volumes of data over the cellular network, if the user's endpoint is not associated with an unlimited cellular data plan. Thus, in some embodiments, each service can be associated with two priorities: a first priority that represents the user's preference for that service when the endpoint is coupled to the network via WiFi and a second priority that represents the user's preference for that service when the endpoint is coupled to the network via cellular data. Moreover, each service can be associated with a threshold download speed (e.g., 5 mbps) or a threshold upload speed (e.g., 1 mbps). Thus, an endpoint 130-150 can allow a user to communicate via video conferencing only if the current upload speed for the endpoint is greater than 1 mbps, or only if the endpoint is coupled to the network via WiFi.

Communication unit 105 can store information received from network endpoints 130-150 in a memory. For example, communication unit 105 can store information received from network endpoints 130-150 in one or more database(s) 120. In some embodiments, the inventories of services available to each endpoint 130-150 (and other information regarding the endpoint) are received by communication unit 105 and stored in one or more database(s) 120. Thus, database(s) 120 can contain, for each endpoint 130-150, an inventory of services provided by the endpoint 130-150 and priority information associated with each available service.

In accordance with certain embodiments, communication unit 105 determines one or more services that are common to a plurality of endpoints 130-150. For example, communication unit 105 can determine a set of services that are provided by each of a plurality of endpoints 130-150 identified in a request to initiate a communication session. In some embodiments, communication unit 105 determines an inventory of services provided by each endpoint by accessing database(s) 120, which can associate endpoints 130-150 with inventories of available services and other information (e.g., priority associated with each service). Alternatively, communication unit 105 can determine an inventory of services provided by each endpoint 130-150 by requesting, at any time (e.g., before or during a session) that each endpoint 130-150 send to communication unit 105 an identification of services provided by the endpoint 130-150. After identifying the services provided by each endpoint 130-150, communication unit 105 can compare the inventories of services and identify one or more services common to all endpoints 130-150. In addition, communication unit 105 can identify one or more other services that are common only to a subset of endpoints 130-150. For example, communication unit 105 can identify an inventory of all services that are provided by at least fifty percent of endpoints 130-150 identified in the request to initiate the communication session.

According to certain embodiments, communication unit 105 provides information to network endpoints 130-150 regarding the services available to other endpoints 130-150. For example, communication unit 105 can provide a requesting endpoint 130 an identification of the services that are available to each endpoint 130-150 identified in a request to initiate a communication session, such that the requesting endpoint 130 can select a means according to which the endpoint 130 wishes to conduct the session. In some embodiments, communication unit 105 provides the requesting endpoint 130 this identification prior to initiating the communication session. In other embodiments, the conferencing session is automatically initiated using a service that is common to all endpoints 130-150 (e.g., audio conferencing), and communication unit 105 provides the identification of common services to the requesting endpoint 130 after the session has been initiated. Moreover, in some embodiments, the inventory of common services is provided to each endpoint 130-150 participating in the communication session, such that any endpoint 130-150 can select a service through which the session can be conducted. Further, an endpoint 130-150 can select more than one service through which the session can be conducted. For example, an endpoint 130 can select audio conferencing and screen sharing if the user of endpoint 130 wants to talk users of endpoints 140 and 150 through actions that the user is taking on the user's desktop while also demonstrating those actions.

Communication unit 105 facilitates communication among the endpoints 130-150 identified in the request to initiate the communication session. In some embodiments, communication unit 105 hosts the communication session among the identified endpoints 130-150. Thus, communication unit 105 can initiate a communication session in a default mode or service (e.g., audio conferencing) and, after receiving a request from one or more endpoints 130-150, extend the communication session to include additional services (e.g., video conferencing and instant messaging). In these embodiments, all communications among network endpoints 130-150 pass through communication unit 105 (via network 160). Moreover, the list of endpoints 130-150 engaged in communication using one service can be different from the list of endpoints 130-150 engaged in communication using another service, within the same communication session. For example, in a communication session involving three endpoints 130-150, all three of the endpoints 130-150 can be engaged in audio conferencing, and two of the three endpoints 130-150 can also be engaged in video conferencing, within the same communication session.

In some embodiments, communication unit 105 facilitates communication among the endpoints 130-150 identified in the request by providing information to each endpoint 130-150 that enables the identified endpoints to initiate a peer-to-peer communication session. Thus, in these embodiments, communication unit 105 receives inventories of available services from each endpoint 130-150 and provides an identification of common services to each endpoint 130-150, but does not host the communication session among the endpoints 130-150. These embodiments can be of particular use when the endpoints 130-150 attempt to engage in communication via a service that is not available via the server. For example, if three endpoints 130-150 have screen sharing capability, but that capability is not supported by communication unit 105, then communication unit 105 can provide the endpoints 130-150 with the information that each endpoint 130-150 needs to communicate with one another, and the endpoints can conduct the screen sharing session using peer-to-peer communication.

As discussed above, data used by communication unit 105 to facilitate communication among network endpoints 130-150 can be stored in one or more database(s) 120. For example, database 120 can store network endpoint identifiers, inventories of available services for each endpoint 130-150, priority data associated with each service, and profile data associated with each endpoint 130-150. Database 120 can be any suitable combination of large scale data storage devices, which can optionally include any type or combination of slave databases, load balancers, dummy servers, firewalls, back-up databases, and any other desired database components.

Users can communicate with one another in conferencing sessions using client devices, such as network endpoints 130-150. Network endpoints 130-150 can include landline telephones, cellular phones, laptops, personal computers, and tablets, among other networked devices. Network endpoints 130-150 can also include various applications for facilitating conferenced communications. Network endpoints 130-150 can support one or more conferencing services, such as audio conferencing, video conferencing, screen sharing, instant messaging, whiteboarding, and location sharing. Each network endpoint 130-150 can store priority information specifying the priority that should be associated with each service supported by the network endpoint 130-150, as discussed above. Additionally, or alternatively, each network endpoint 130-150 can store one or more user profiles, which, as discussed above, can include profile data that describes a user's communication preferences. For example, the profile data can include priority data for each service and an indication of whether the service is supported when the endpoint 130-150 is coupled to the network via cellular data.

According to certain embodiments, network endpoints 130-150 transmit information to and from communication unit 105 via network 160. For example, network endpoints 130-150 can submit to communication unit 105 requests to initiate communication sessions, inventories of available services, service prioritization information, profile data, and communications data (e.g., audio or video data). Further, network endpoints 130-150 can receive information from communication unit 105, such as an identification of common services available to the network endpoints 130-150 and communications data (e.g., audio or video data) from one or more other endpoints 130-150.

In some embodiments, network endpoints 130-150 communicate with one another in a peer-to-peer manner. For example, network endpoint 130 can send through network 160 to communication unit 105 a request to initiate a communication session with network endpoints 140 and 150. In response, communication unit 105 can provide network endpoint 130 with an inventory of services that are common to each of network endpoints 130-150. If the user of network endpoint 130 selects to conduct a communication session with network endpoint 140, endpoint 150, or both using a service that is not supported by communication unit 105 (e.g., communication unit 105 cannot host the service), communication unit 105 can provide network endpoint 130 (and network endpoints 140 and 150) with the information needed to establish peer-to-peer communication using the selected service.

Figure 2:
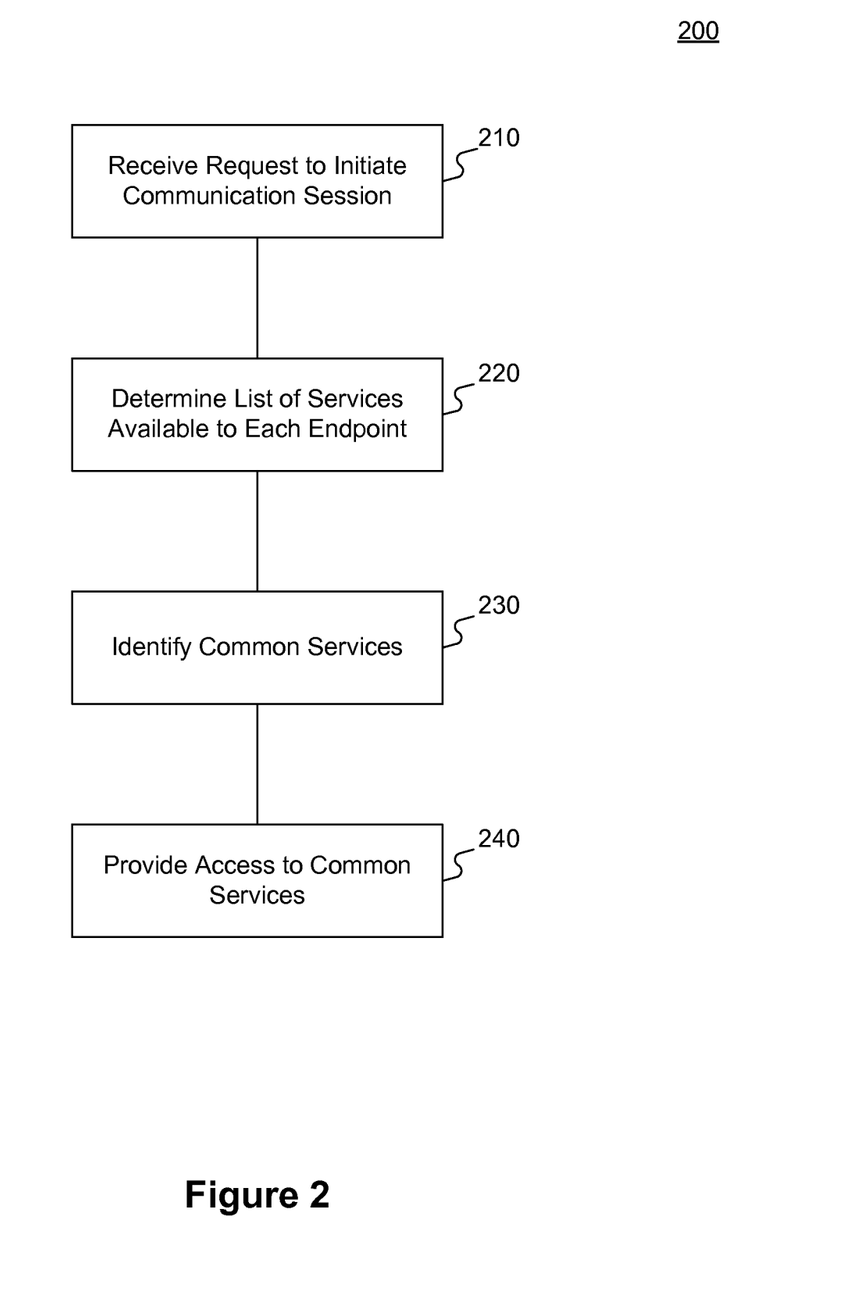
FIG. 2 illustrates an example process for providing access to common services, in accordance with embodiments of the present disclosure.

FIG. 2 depicts an example process 200 for providing access to common services, in accordance with some embodiments of the present disclosure. The steps associated with this example process can be performed by components of FIG. 1, 4, 5, 6, or 7. In the following description, reference is made to certain components of FIG. 1 for purposes of illustration. It will be appreciated, however, that other implementations are possible and that components other than that illustrated in FIG. 1 can be utilized to implement the example method of FIG. 1.

In step 210, a system (e.g., communication unit 105) receives a request to initiate a communication session (e.g., a SIP-based communication session). The communication session can include a plurality of endpoints 130-150, which can be identified in the request. In addition to an identification of a requesting endpoint and one or more other endpoints with which the requesting endpoint desires to communicate, the request can include additional information, such as an inventory of services provided at or available to the requesting endpoint, priority data associated with each service, and profile data describing communication preferences associated with the requesting endpoint.

The system determines an inventory of available services for each of the plurality of endpoints at step 220. Available services can include any service that can be used by network endpoints to communicate in a conferencing session, such as audio conferencing, video conferencing, screen sharing, instant messaging, whiteboarding, and location sharing. In some embodiments, determining an inventory of services available to each of the plurality of endpoints can comprise receiving, from each of the plurality of endpoints, an inventory of services available to the endpoint. For example, the system can request an inventory of available services from each of network endpoints (e.g., network endpoints 130-150) and receive an identification of available services from each in response. In other embodiments, the system determines an inventory of services available to each of the plurality of endpoints by accessing, from a database (e.g., database 120), an inventory of services available to the endpoint.

At step 230, the system identifies at least one common service available to at least a subset of the plurality of endpoints. At step 240, the system provides access to the at least one common service to the subset during the communication session. In some scenarios, at least one service can be common to each of the endpoints in the communication session. Thus, in some embodiments, identifying at least one common service available to at least a subset of the plurality of endpoints comprises identifying at least one common service available to each of the plurality of endpoints. And the system can provide access to the at least one common service to each of the plurality of endpoints engaged in the communication session.

According to certain embodiments, providing access to the at least one common service to the subset during the communication session comprises sending an identification of the at least one common service to each endpoint in the subset. For example, the system can send an identification of the at least one common service to the network endpoints (e.g., endpoints 130-150). A user of one of these endpoints (e.g., endpoint 130) can select the at least one common service and send a request back to the system that each endpoint for which the at least one common service is available be provided access to that service. In another embodiment, the system waits for selection of at least one common service prior to initiating the communication session. Thus, providing access to the at least one common service to the subset during the communication session can comprise initiating the communication session in a mode corresponding to the at least one common service. In yet another embodiment, the system notifies at least one of the endpoints not within the subset regarding the availability of the at least one common service. This can make a user of an endpoint aware of additional services that are available for use in the communication session and allow the user to consider installing the service on the endpoint, so that the user can communicate with users of the other endpoints using the service in the future.

In some embodiments, the system provides access to the at least one common service by providing information to the subset that enables the subset to engage in peer-to-peer communication using the at least one common service. As discussed above, this can be particularly useful when the system does not have the capability to host the at least one common service locally. In other embodiments, the system provides access to the at least one common service by hosting the at least one common service. Moreover, the system can also host at least one additional common service for the plurality of endpoints while hosting the at least one common service for the subset. For example, the system can host one service for all endpoints in the communication session and another service for a subset of the endpoints, if only the subset of endpoints have the capability to communicate via the other service.

Figure 3:
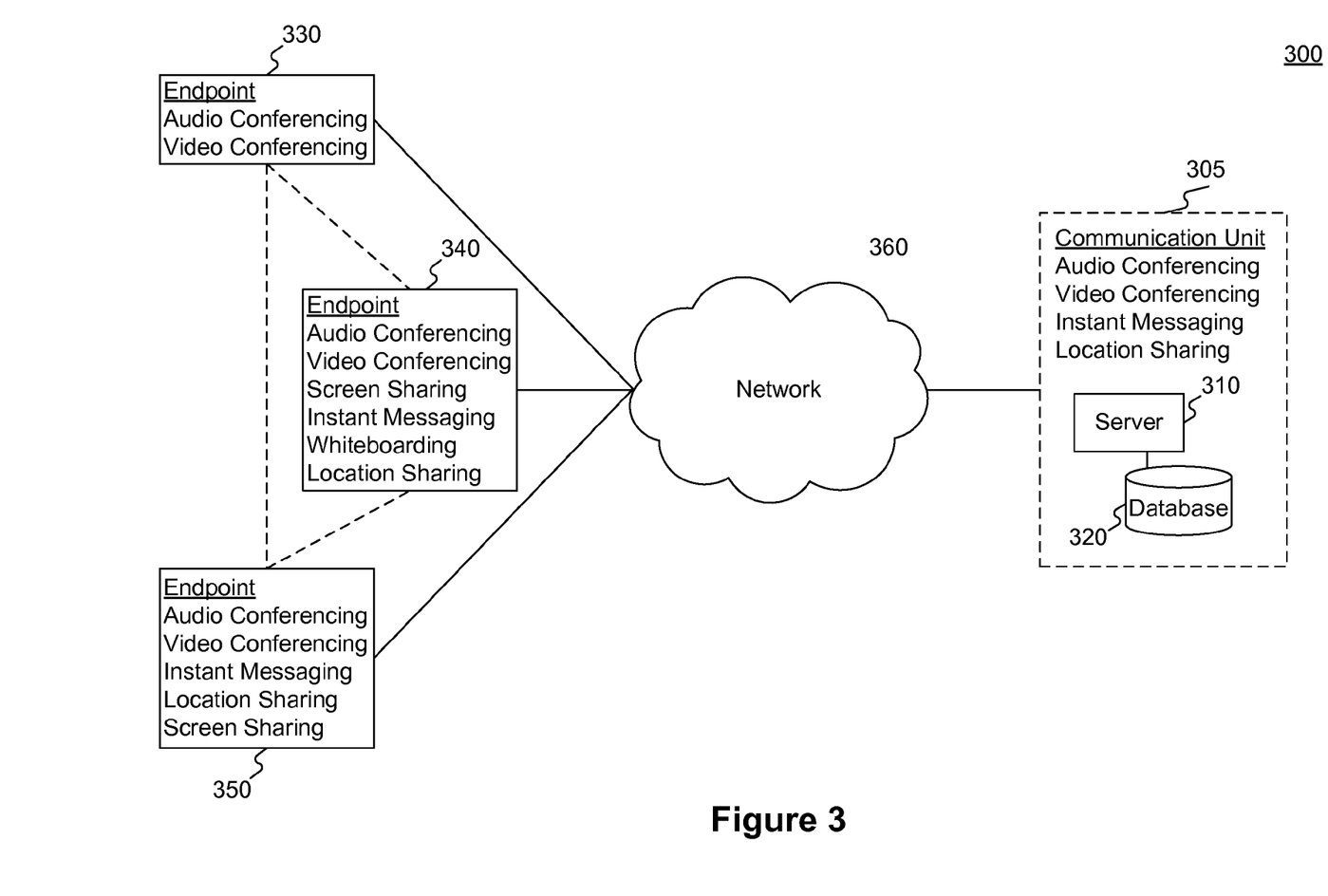
FIG. 3 is a diagram of a system environment for providing access to common services, in accordance with embodiments of the present disclosure.

FIG. 3 illustrates an example system environment for providing access to common services. More particularly, FIG. 3 depicts each of the components of the example system environment of FIG. 1, along with additional information regarding a hypothetical inventory of services available to each network endpoint 330-350 and the communication unit 305. As shown in FIG. 3, audio and video conferencing are available to endpoint 330; audio and video conferencing, screen sharing, instant messaging, whiteboarding, and location sharing are available to endpoint 340; audio and video conferencing, instant messaging, location sharing, and screen sharing are available to endpoint 350.

The steps of FIG. 2 may be better understood by reference to the implementation depicted in FIG. 3. For example, endpoint 340 can submit a request to communication unit 305 over network 360 to initiate a communication session with endpoints 330 and 350. The request can include an identification of the services that are available to endpoint 340 and profile data that specifies the communication preferences of a user of endpoint 340. For example, the profile data can specify that video conferencing, screen sharing, and whiteboarding should only be considered available services for endpoint 340 if endpoint 340 is coupled to network 360 via WiFi.

Communication unit 305 can receive the request at step 210 and store the profile data in database 120. Communication unit 305 can then access database 320 to determine the inventory of services available to each of the other endpoints identified in the request (i.e., endpoints 330 and 350) at step 220. Communication unit 305 can also send a request to endpoints 330 and 350 over network 360 for an identification of the services available to those endpoints. After receiving a response from endpoints 330 and 350, communication unit 305 can store the received inventories of available services in database 320.

Based on the inventories of available services, communication unit 305 can identify at least one service that is common to endpoints 330, 340, and 350 at step 230. In the hypothetical implementation shown in FIG. 3, communication unit 305 would identify audio conferencing and video conferencing as services that are common to each endpoint. Moreover, communication unit 305 can also identify services that are available to a subset of endpoints. For example, communication unit 305 can determine that, in addition to audio and video conferencing, instant messaging, location sharing, and screen sharing are common to network endpoints 340 and 350.

At step 240, communication unit 305 can provide access to a common service to endpoints 330, 340, and 350. To determine which service to provide, communication unit 305 can notify endpoints 330, 340, and 350 of the services that are common to each (or a subset) of the endpoints and request that a user of an endpoint identify which services should be initiated as part of the communication session. For example, communication unit 305 can notify each endpoint that audio and video conferencing are available at each endpoint, and a user of endpoint 340 can select audio conferencing. Thus, communication unit 305 can initiate an audio conferencing session for endpoints 330, 340, and 350. Communication unit 305 can also notify endpoints 340 and 350 that instant messaging, location sharing, and screen sharing are available services for those endpoints, and endpoint 340 can select instant messaging. Thus, communication unit 305 can initiate an instant messaging session between endpoints 340 and 350. Because communication unit 305 is capable of hosting audio and video conferencing, instant messaging, and location sharing, the audio conferencing session among the three endpoints, as well as the instant messaging session between endpoints 340 and 350, can be hosted by communication unit 305. If a user of endpoint 340 or 350 requests to initiate a screen sharing session, however, communication unit 305 can provide endpoints 340 and 350 with the information necessary for those endpoints to engage in a peer-to-peer screen sharing session, as communication unit 305 does not have the capability to host a screen sharing session.

Figure 4:
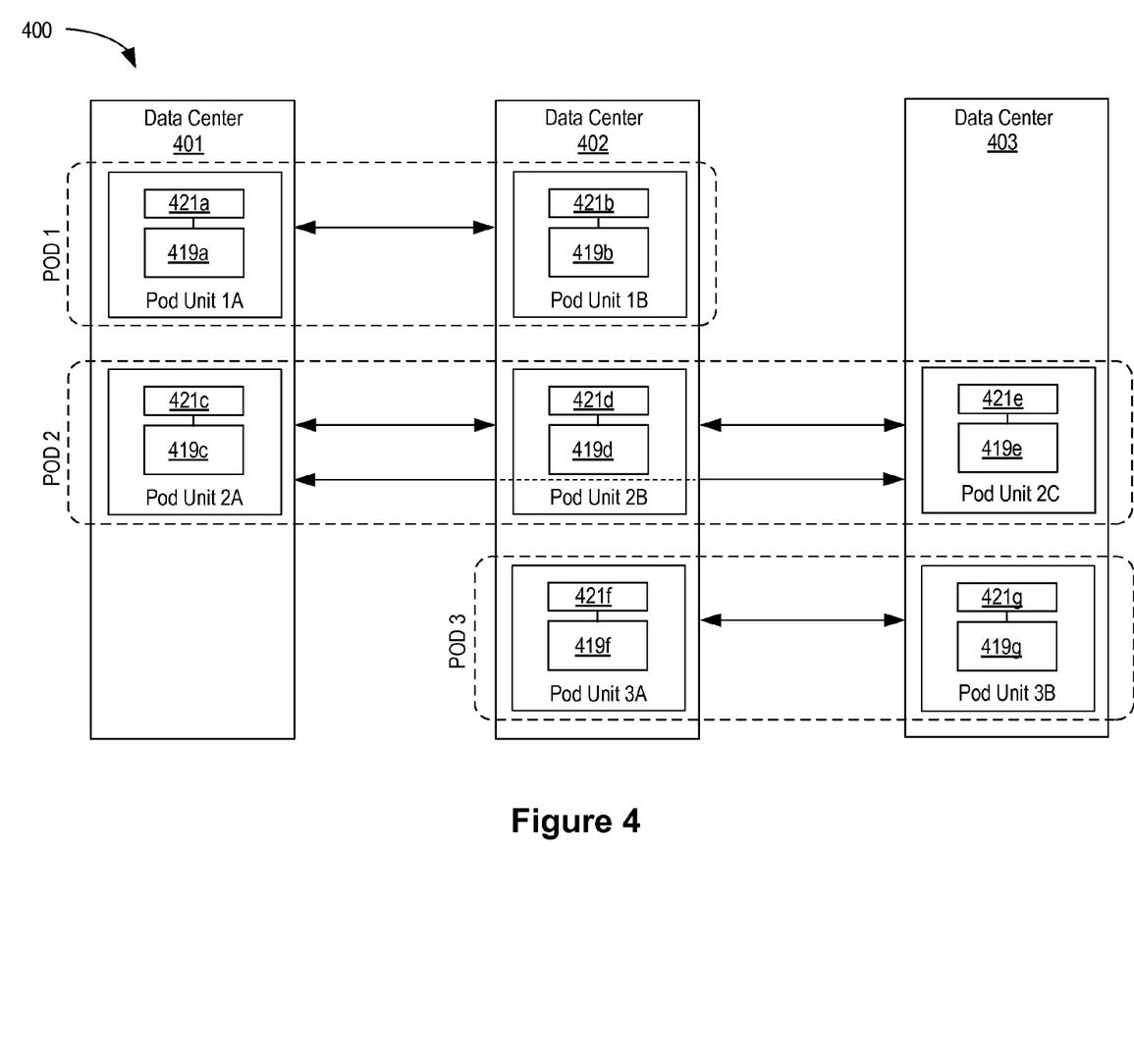
FIGS. 4 and 5 are simplified diagrams of an example of a communication system in which various implementations described herein may be practiced.

FIG. 4 shows an example of a communication system 400 in which systems and methods of making common services available to endpoints as described herein may be implemented. In some examples, components of communication system 400 can be used to implement computer programs, applications, methods, processes, or other software to perform the above-described techniques and to realize the structures described herein. For example, communication server 419a-419g can be used to implement the functionalities of servers 110 and 310, and account database 421a-421g can be used to implement the functionalities of databases 120 and 320.

System 400 can be, for example, a telephony system such as a hosted Private Branch Exchange (PBX) platform that provides voice and video over IP, fax services, etc. Communication system 400 includes data centers 401, 402, and 403. Each data center is a point of presence (POP) that includes the network computing resources (e.g., servers, routers, switches, network connections, storage devices, etc.) for supporting the services provided by communication system 400. Each data center is typically located in a different geographical region.

In the depicted example, communication system 400 includes three user points of data (pods), i.e., pods 1, 2 and 3, each of which is a logical grouping of two or more pod units situated in different data centers. Each pod serves a different subset of user accounts. In this example, each pod unit (e.g., unit 2A) serves the same subset of users as the other pod units within the same pod (e.g., pod units 2B and 2C). Each pod unit includes a communication server 419a-419g configured to provide substantially the same services to the same subset of users as the other pod units within the same pod. Each pod unit also includes an account database 421a-421g configured to support the respective communication servers for the corresponding subset of users. It should be noted that the term "user" is being used in the interest of brevity and may refer to any of a variety of entities that may be associated with a subscriber account such as, for example, a person, an organization, an organizational role within an organization, a group within an organization, etc.

Figure 5:
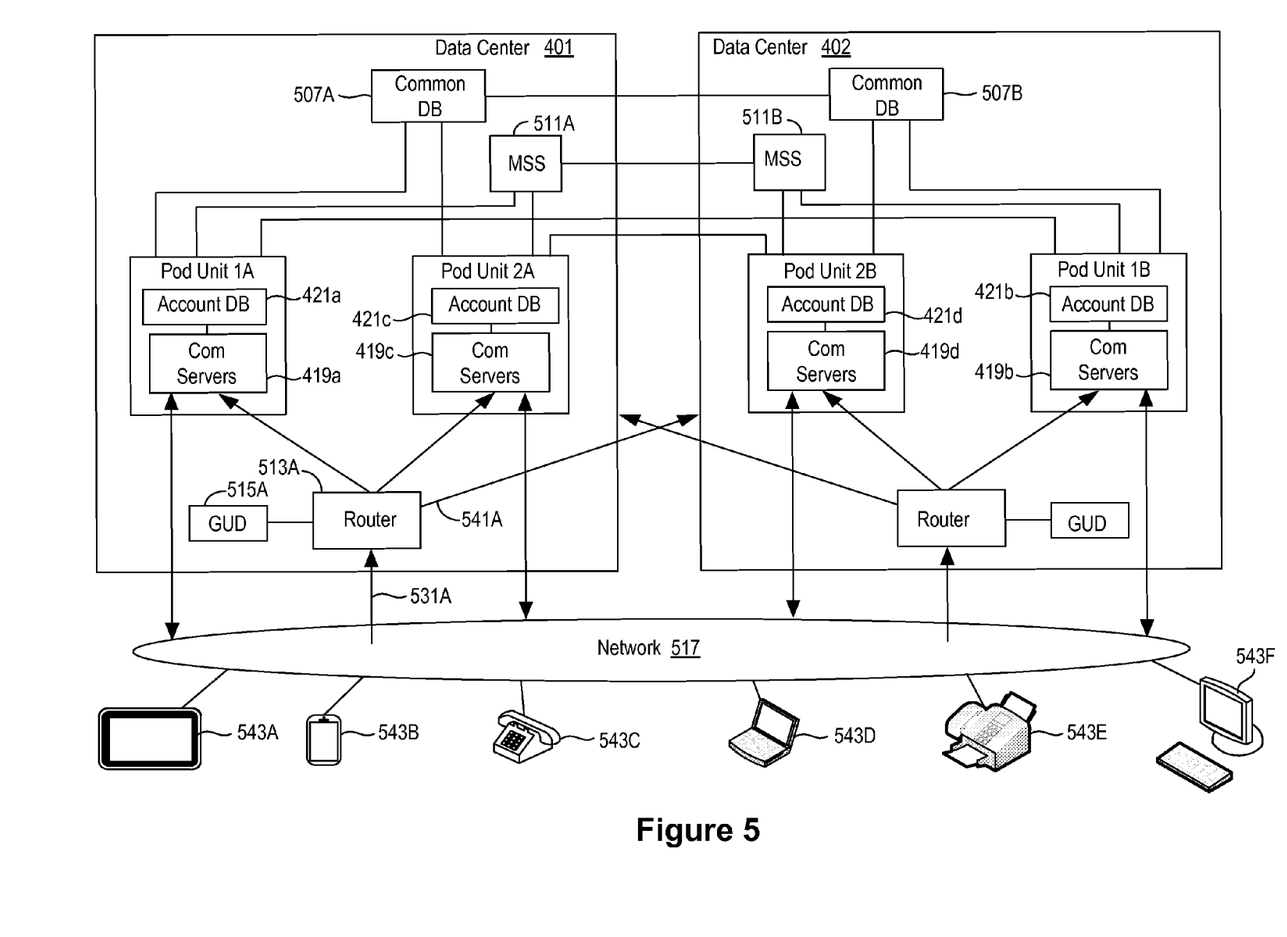

FIG. 5 shows various components of communication system 400 of FIG. 4. Specifically, FIG. 5 shows the various interconnections within and between data centers 401 and 402. Both data centers are in communication with network 517. Service requests from various communication devices 543A-543F are routed through network 517 to either or both of the data centers. Devices 543A-543F represent a diversity of client devices that connect with a services system designed in accordance with one or more implementations as described herein. Such client devices include, for example (and without limitation), cell phones, smart phones, tablets, laptop and desktop computers, conventional telephones, VOIP phones, teleconferencing devices, videoconferencing devices, set top boxes, gaming consoles, wearable computing devices, smartwatches, etc. Reference to specific client device types should therefore not be used to limit the scope of the present disclosure. In some examples, devices 543A-543F may represent the endpoints 130-150 and 330-350 depicted in FIGS. 1 and 3, respectively.

Data center 401 includes pod units 1A and 2A, a common database (CDB) 507A, a message storage system (MSS) 511A, a router 513A, and a global user directory (GUD) 515A. Additional pod units (not shown) may also be included in data center 401. Data center 402 is similarly configured and includes components that operate substantially the same as those in data center 401. Data centers 401 and 402 provide backup and redundancy to one another in the event of failure.

Communication servers 419 provide telecommunication services (e.g., voice, video, email, and/or facsimile) to corresponding subsets of users. Each server 419 may also provide other services including, for example, user account management and configuration, billing services, accounting services, etc. Each pod unit includes an account database 421 to support the communication server(s) for that particular pod unit, storing configuration details and other information regarding each user's account. In some example, the functionalities of servers 110 and 310 can be implemented in servers 419, and the functionalities of databases 120 and 320 can be implemented in account databases 421.

Pod units 1A and 1B are in communication with one another so that the data on their respective account databases are synchronized across data centers. Data center 401 includes router 513A to receive an incoming service request 531A from network 517. Router 513A parses the incoming service request to identify or extract a user key and queries GUD 515A to determine which pod is associated with the user key. Router 513A also routes the service request to the pod unit in the data center associated with the identified pod. If, for example, the pod unit associated with the identified pod is not associated with data center 401, router 513A routes the service request to another data center (e.g., data center 402 as indicated by the arrow 541A).

Each pod unit of the data center 401 is also coupled to MSS 511A which stores files for the users served by pod units 1A and 2A. These files may include, for example, messages (e.g., voicemails and facsimiles), user logs, system messages, system and user call prompts (e.g., auto-attendant or user-recorded greetings), and other types of call-related or electronic messages. The contents of MSS 511A are synchronized with other data centers (e.g., synchronized with MSS 511B of data center 402).

Each pod unit in data center 401 is coupled to common database 507A which stores shared data for all of the pods, and stores consolidated information from account databases 421. Common database 507A also facilitates changes to the pod databases. For example, common database 507A may store data for applications that provide the services on communication servers 419. Different versions of the applications data may be stored in common database 507A, allowing allow changes and upgrades to communication servers 419 to be implemented efficiently and conveniently. Changes may be made to common database 507A and propagated to pod units 1A and 2A. Common database 507A is synchronized across data centers to other common databases (e.g., common database 507B of data center 402). Common database 507A, MSS 511A, router 513A, and GUD 515A form a common layer of resources that are shared by all pod units in data center 401.

Figure 6:
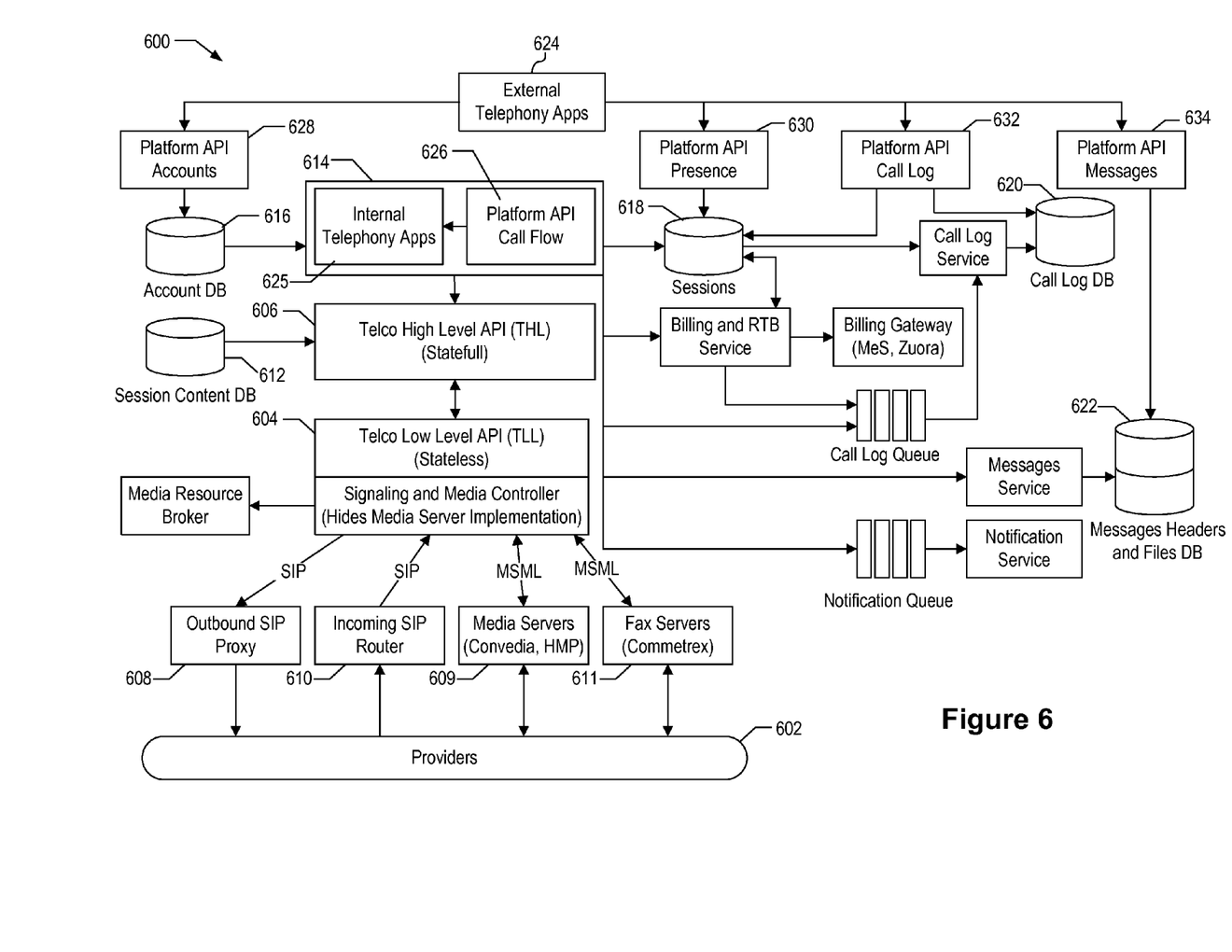
FIG. 6 is a simplified block diagram of an example of a telephony services platform employing techniques as described herein.

FIG. 6 is a simplified block diagram of an example of a PBX platform (e.g., communication system 400 of FIGS. 4 and 5) employing techniques for making common services available to endpoints as described herein. PBX platform 600 provides telephony services that allow communication among its users, and between its users and users associated with a variety of external telephony providers 602 via telecommunication APIs 604 and 606, outbound SIP proxy 608, and incoming SIP router 610. Media servers 609 and fax servers 611 provide functionality for processing voice over IP and fax over IP data, respectively. Telco low level API 604 is a stateless low-level API that provides signaling and media telephony primitives including, for example, call answering, placing of outbound calls, creation of conference call objects, addition of calls to conference call objects, playback of media for active calls, recording of active calls, etc. Telco high level API 606 is a higher-level API that has more sophisticated functionality such as, for example, interactive voice response (IVR), call forwarding, voice mail, etc. In the depicted implementation, telco high level API 606 doesn't have access to the PBX platforms databases, but maintains session context data of session context DB 612 to support its functionality. Telco high level API 606 may include function primitives which can be used to support the development of telephony applications.

Outbound SIP proxy 608 and incoming SIP router 610 employ SIP, an IETF-defined signaling protocol widely used for controlling communication sessions such as voice and video calls over IP. SIP can be used for creating, modifying and terminating two-party (unicast) or multiparty (multicast) sessions, and may be one of the core protocols employed by systems configured as shown in and described above with reference to FIGS. 4 and 5.

The core functionality of PBX platform 600 (e.g., as described above with reference to FIGS. 4 and 5) is accessed via telephony services block 614 which has access (not entirely shown for clarity) to the various data repositories of PBX platform 600, e.g., account database (DB) 616, sessions DB 618, call log DB 620, and messages headers and files DB 622. Telephony services block 614 receives commands from telephony applications 624 and controls execution of the commands on the PBX platform 600. Telephony services block 614 can also include internal telephony applications 625 that are hosted and/or developed on or in connection with PBX platform 600. The depicted implementation also includes various APIs that allow external telephony applications 624 to interact with PBX platform 600. The APIs associated with PBX platform 600 allow telephony applications 624 and 625 to integrate with basic functionality of PBX platform 600 at multiple integration points, to control call flows during execution of the call flows by the platform (e.g., via API 626), and to access platform data (e.g., in DBs 616-622 via APIs 628-634).

Figure 7:
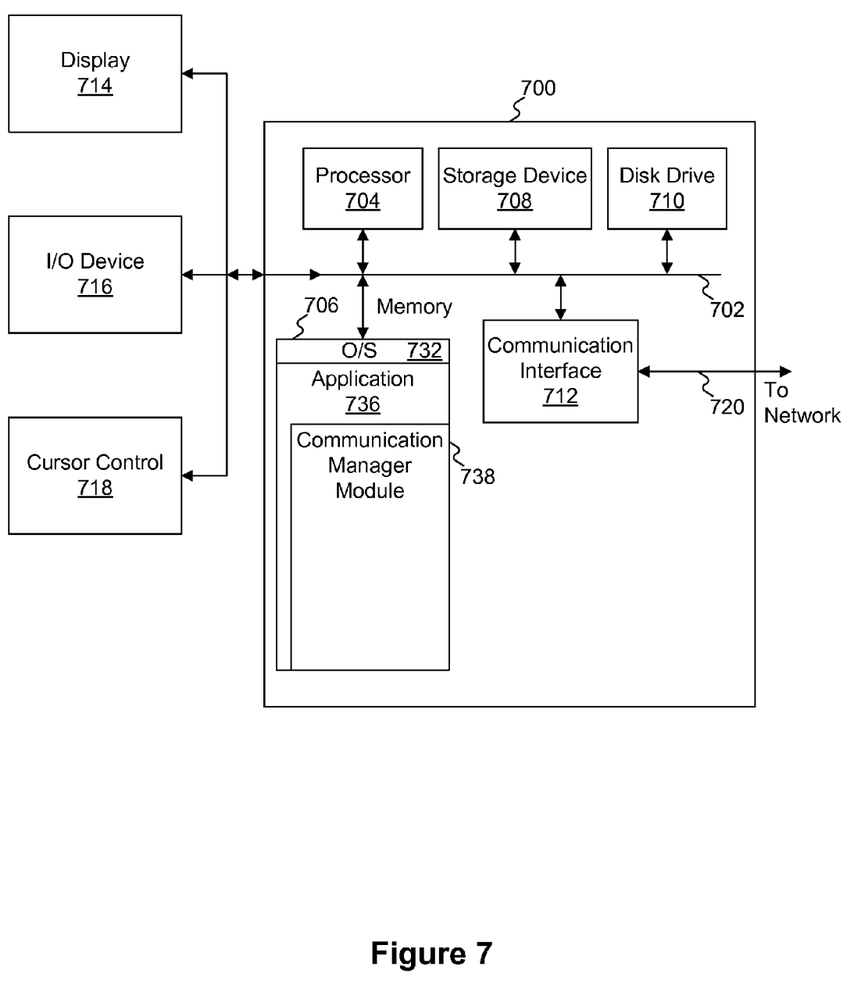
FIG. 7 is a diagram of another example system environment for implementing embodiments consistent with the present disclosure.

FIG. 7 illustrates an example computer system suitable for providing access to common services, according to at least one embodiment. In some examples, computer system 700 can be used to implement computer programs, applications, methods, processes, or other software to perform the above-described techniques and to realize the structures described herein, such as communication units 105 and 305 or servers 110 and 310, as well as network endpoints 130-150 and 330-350. Computer system 700 includes a bus 702 or other communication mechanism for communicating information, which interconnects subsystems and devices, such as one or more processors 704, system memory ("memory") 706, storage device 708 (e.g., ROM), disk drive 710 (e.g., magnetic or optical), communication interface 712 (e.g., a modem, Ethernet card, or any other interface configured to exchange data with a communications network), display 714 (e.g., CRT or LCD), input device 716 (e.g., keyboard), and pointer cursor control 718 (e.g., mouse or trackball).

According to some examples, computer system 700 performs specific operations in which processor 704 executes one or more sequences of one or more instructions stored in system memory 706. Such instructions can be read into system memory 706 from another computer readable medium, such as static storage device 708 or disk drive 710. In some examples, hard-wired circuitry can be used in place of or in combination with software instructions for implementation. In the example shown, system memory 706 includes modules of executable instructions for implementing an operation system ("O/S") 732, an application 736, and a communication manager module 738, which can provide the functionalities disclosed herein.

In some examples, execution of the sequences of instructions can be performed by a single computer system 700. According to some examples, two or more computer systems 700 coupled by communication link 720 (e.g., links to LAN, PSTN, or wireless network) can perform the sequence of instructions in coordination with one another. Computer system 700 can transmit and receive messages, data, and instructions, including program code (i.e., application code) through communication link 720 and communication interface 712. Received program code can be executed by processor 704 as it is received, and stored in disk drive 710, or other non-volatile storage for later execution.

In the preceding specification, various example embodiments have been described with reference to the accompanying drawings. It will, however, be evident that various modifications and changes may be made thereto, and additional embodiments may be implemented based on the principles of the present disclosure. The specification and drawings are accordingly to be regarded in an illustrative rather than restrictive sense.

For example, advantageous results still could be achieved if steps of the disclosed techniques were performed in a different order or if components in the disclosed systems were combined in a different manner or replaced or supplemented by other components. Other implementations are also within the scope of the following example claims.

What is claimed is:

1. A system for providing access to common services, the system comprising:
   at least one network interface; and
   at least one processor in communication with the network interface and configured to:
   receive, via the at least one network interface, a first request to initiate a communication session, the communication session including a plurality of endpoints;

determine, in response to the first request, an inventory of services available to each of the plurality of endpoints;

identify at least two common services available to at least a subset of the plurality of endpoints, the subset including at least two endpoints;

send an identification of the at least two common services to each endpoint in the subset;

receive a second request to provide access to at least one of the at least two common services to the subset; and provide access to the at least one common service to the subset during the communication session based on the second request.

2. The system of claim 1, wherein the determination of an inventory of services available to each of the plurality of endpoints is based on a receipt, from each of the plurality of endpoints, of an inventory of services available to the endpoint.

3. The system of claim 1, wherein the system further comprises a database comprising, for each endpoint, an inventory of services available to the endpoint, and wherein the at least one processor is configured to determine an inventory of services available to each of the plurality of endpoints by accessing the database.

4. The system of claim 1, wherein the inventory of services available to an endpoint comprises at least one service from the group consisting of audio conferencing, video conferencing, screen sharing, instant messaging, whiteboarding, and location sharing.

5. The system of claim 1, wherein the at least one processor is configured to:

identify, for each of the plurality of endpoints, a connection type, wherein the connection type is cellular data or WiFi;

receive, for each of the plurality of endpoints, a first priority and a second priority for each service in the inventory of services for the endpoint, wherein the first priority indicates a preference for the service when the connection type for the endpoint is cellular data and the second priority indicates a preference for the service when the connection type for the endpoint is WiFi; and filter, for each of the plurality of endpoints, at least one service from the inventory of services for the endpoint if the connection type for the endpoint is cellular data and the first priority for the service indicates the service is not preferred for the endpoint when the connection type for the endpoint is cellular data.

6. The system of claim 1, wherein the at least one processor is configured to:

identify at least two common services available to at least a subset of the plurality of endpoints by identifying at least two common services available to each of the plurality of endpoints; and provide access to the at least one common service to the subset during the communication session by providing access to the at least one common service to each of the plurality of endpoints.

7. The system of claim 1, wherein the at least one processor is configured to provide access to the at least one common service to the subset during the communication session by initiating the communication session in a mode corresponding to the at least one common service.

8. The system of claim 1, further wherein the at least one processor is further configured to notify at least one of the endpoints not within the subset regarding the availability of the at least one common service.

9. The system of claim 1, wherein the at least one processor is configured to provide access to the at least one common service to the subset during the communication session by providing information to the subset that enables the subset to engage in peer-to-peer communication using the at least one common service.

10. The system of claim 1, wherein the at least one processor is configured to provide access to the at least one common service to the subset during the communication session by hosting the at least one common service.

11. The system of claim 10, wherein the at least one processor is further configured to simultaneously host at least one additional common service for the plurality of endpoints while hosting the at least one common service for the subset.

12. A computer-implemented method for providing access to common services, the method performed by one or more processors and comprising:

receiving, over a network, a first request to initiate a communication session, the communication session including a plurality of endpoints;

determining, by at least one processor and in response to the first request, an inventory of services available to each of the plurality of endpoints;

identifying at least two common services available to at least a subset of the plurality of endpoints, the subset including at least two endpoints;

sending an identification of the at least two common services to each endpoint in the subset;

receiving a second request to provide access to at least one of the at least one common services to the subset; and providing access to the at least one common service to the subset during the communication session based on the second request.

13. The computer-implemented method of claim 12, wherein determining an inventory of services available to each of the plurality of endpoints comprises receiving, from each of the plurality of endpoints, an inventory of services available to the endpoint.

14. The computer-implemented method of claim 12, wherein determining an inventory of services available to each of the plurality of endpoints comprises accessing a database comprising, for each endpoint, an inventory of services available to the endpoint.

15. The computer-implemented method of claim 12, wherein the inventory of services available to an endpoint comprises at least one service from the group consisting of audio conferencing, video conferencing, screen sharing, instant messaging, whiteboarding, and location sharing.

16. The computer-implemented method of claim 12, further comprising:

identifying, for each of the plurality of endpoints, a connection type, wherein the connection type is cellular data or WiFi;

receiving, for each of the plurality of endpoints, a first priority and a second priority for each service in the inventory of services for the endpoint, wherein the first priority indicates a preference for the service when the connection type for the endpoint is cellular data and the second priority indicates a preference for the service when the connection type for the endpoint is WiFi; and filtering, for each of the plurality of endpoints, at least one service from the inventory of services for the endpoint if the connection type for the endpoint is cellular data and the first priority for the service indicates the service is not preferred for the endpoint when the connection type for the endpoint is cellular data.

17. The computer-implemented method of claim 12, wherein providing access to the at least one common service to the subset during the communication session comprises initiating the communication session in a mode corresponding to the at least one common service.

18. The computer-implemented method of claim 12, wherein providing access to the at least one common service to the subset during the communication session comprises providing information to the subset that enables the subset to engage in peer-to-peer communication using the at least one common service.

19. The computer-implemented method of claim 12, wherein providing access to the at least one common service to the subset during the communication session comprises hosting the at least one common service for the subset.

20. The computer-implemented method of claim 19, further comprising simultaneously hosting at least one additional common service for the plurality of endpoints while hosting the at least one common service for the subset.

21. A computer-readable storage medium that comprises a set of instructions that are executable by at least one processor to cause the at least one processor to perform a method for providing access to common services, the method comprising:
  acquiring a first request to initiate a communication session, the communication session including a plurality of endpoints;
  determining, in response to the first request, an inventory of services available to each of the plurality of endpoints;
  identifying at least two common services available to at least a subset of the plurality of endpoints, the subset including at least two endpoints;
  sending an identification of the at least two common services to each endpoint in the subset;
  acquiring a second request to provide access to at least one of the at least two common services to the subset; and
  providing access to the at least one common service to the subset during the communication session based on the second request.

22. The computer-readable storage medium of claim 21, wherein the set of instructions cause the at least one processor to determine an inventory of services available to each of the plurality of endpoints by receiving, from each of the plurality of endpoints, an inventory of services available to the endpoint.

23. The computer-readable storage medium of claim 21, wherein the set of instructions cause the at least one processor to determine an inventory of services available to each of the plurality of endpoints by accessing a database comprising, for each endpoint, an inventory of services available to the endpoint.

24. The computer-readable storage medium of claim 21, wherein the inventory of services available to an endpoint comprises at least one service from the group consisting of audio conferencing, video conferencing, screen sharing, instant messaging, whiteboarding, and location sharing.

25. The computer-readable storage medium of claim 21, wherein the set of instructions further cause the at least one processor to:
  identify, for each of the plurality of endpoints, a connection type, wherein the connection type is cellular data or WiFi;
  receive, for each of the plurality of endpoints, a first priority and a second priority for each service in the inventory of services for the endpoint, wherein the first priority indicates a preference for the service when the connection type for the endpoint is cellular data and the second priority indicates a preference for the service when the connection type for the endpoint is WiFi; and
  filter, for each of the plurality of endpoints, at least one service from the inventory of services for the endpoint if the connection type for the endpoint is cellular data and the first priority for the service indicates the service is not preferred for the endpoint when the connection type for the endpoint is cellular data.

26. The computer-readable storage medium of claim 21, wherein the set of instructions cause the at least one processor to provide access to the at least one common service to the subset during the communication session by initiating the communication session in a mode corresponding to the at least one common service.

27. The computer-readable storage medium of claim 21, wherein the set of instructions cause the at least one processor to provide access to the at least one common service to the subset during the communication session by hosting the at least one common service for the subset.

28. The computer-readable storage medium of claim 27, wherein the set of instructions further cause the at least one processor to simultaneously host at least one additional common service for the plurality of endpoints while hosting the at least one common service for the subset.

29. A system for providing access to common services, the system comprising:
  at least one network interface; and
  at least one processor in communication with the network interface and configured to:
    receive, via the at least one network interface, a first request to initiate a communication session, the communication session including a plurality of endpoints;
    receive, from each of the plurality of endpoints and based on the first request, an inventory of services available to the endpoint;
    identify at least two common services available to at least a subset of the plurality of endpoints, the subset including at least two endpoints;
    send an identification of the at least two common services to each endpoint in the subset;
    receive a second request to provide access to at least one of the at least two common services to the subset; and
    host the at least one common service for the subset based on the second request.

* * * * *